Nov. 24, 1970    J. J. SENNELLO    3,542,992
METHOD AND APPARATUS FOR RESISTANCE WELDING
Filed Feb. 28, 1968
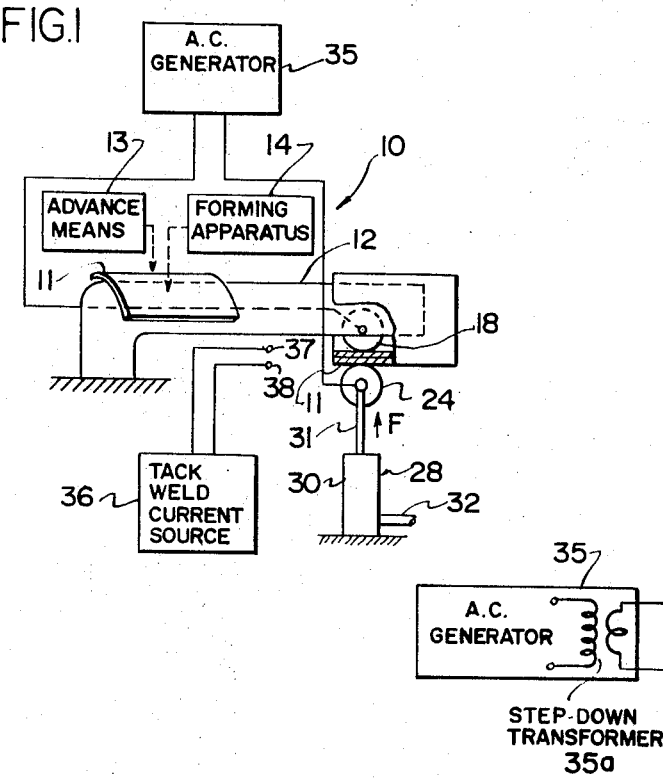
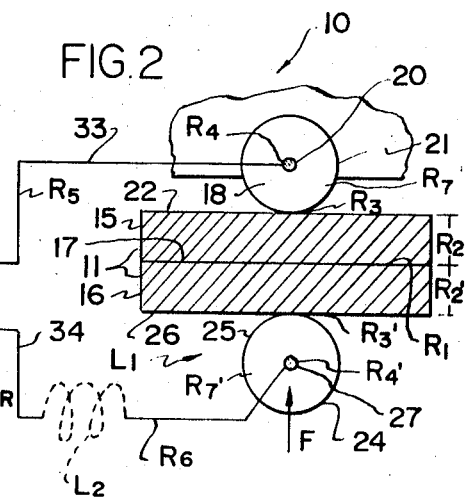
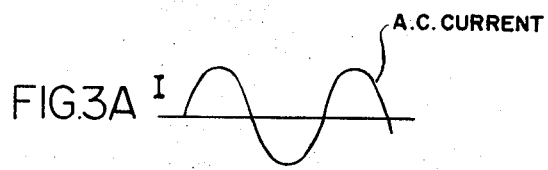
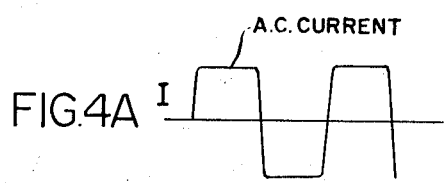
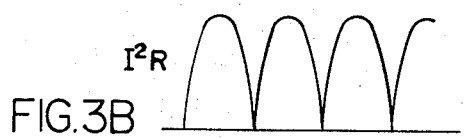
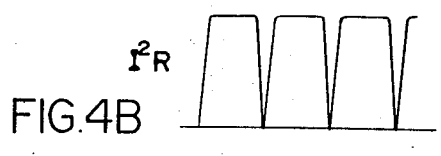
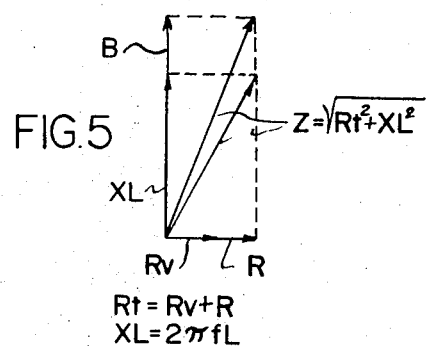
$Rt = Rv + R$
$XL = 2\pi fL$
INVENTOR.
JOSEPH J. SENNELLO
BY *Petherbridge, O'Neill & Aubel*
ATTORNEYS.

3,542,992
METHOD AND APPARATUS FOR RESISTANCE WELDING

Joseph J. Sennello, Oak Lawn, Ill., assignor to Continental Can Company, Inc., New York, N.Y., a corporation of New York
Filed Feb. 28, 1968, Ser. No. 709,030
Int. Cl. B23k 11/24
U.S. Cl. 219—64               20 Claims

ABSTRACT OF THE DISCLOSURE

A method and apparatus are disclosed herein including the method of resistance welding wherein metallic blanks are overlapped, the overlapping portions are inserted between cooperating electrodes and an alternating current is passed therethrough to form a weld. The alternating current is of a frequency sufficient to produce an inductive reactance in the conductive path of the electrodes which exceeds in ohmic value the resistance within such path. Apparatus for performing the method of the invention includes cooperating electrodes, conductive means electrically connected thereto and an alternating current generator having the frequency characteristic set forth above.

BACKGROUND OF THE INVENTION

Field of the invention

This invention relates to an improved method of resistance welding; the precise Patent Office classification of related patents is not known.

Description of the prior art

The known prior art shows apparatus for alternating current resistance welding wherein various devices and methods are disclosed for maintaining the current through the welding path constant.

Such previous attempts have met with little or no success inasmuch as it has not been possible to regulate the resistance in the path of the welding current so that a relatively constant current can be supplied to provide the weld. The variations in resistance are due to the difficulty of maintaining constant the parameters which contribute to the resisance through which the weld current is to be conducted.

SUMMARY OF THE INVENTION

This invention relates generally to method and apparatus for resitsance welding, and more particularly to a method and apparatus for providing a seam weld along portions of contiguous metallic materials.

In the field of welding can bodies, the blanks for forming the can bodies are commonly formed into a tubular shape having overlapping edge portions. The overlapping edge portions are next passed through, for example, roller electrodes to weld the edge portions. Thickness of the blanks commonly employed in the formation of can bodies is relatively thin and the curretns employable in the welding thereof are of necessity relatively high to provide a suitable weld seam. Accordingly, since the resistance in the current path is relatively low, variations in such resistance have resulted in variations in the weld current through the overlapped edge portions resulting in the heat energy employed n the joning together of the overlapped edge portions to be subject to extreme variations.

In accordance with the foregoing, it is a primary object of this invention to provide an improved method of resistance welding effecting the flow of a relatively constant alternating current through the welding path.

Another object of this invention is to provide apparatus capable of effecing the method in accordance with the foregoing primary object of this invention.

It is another object of this invention to provide a method of seam welding can bodies including the forming of blanks into a tubular shape having overlapped side edge portions, inserting such side edge portions between two aligned electrodes, providing an alternating current as the welding current, and utilizing the inductive reactance of the circuitry to provide an impedance having an ohmic value greater than the ohmic value of the resistance between the two electrodes.

Additionally, it is an object of this invention to provide an apapratus for practicing the above recited method including the provision of cooperating electrodes, means for inserting overlapped metallic blank edge portions between the two electrodes, and means for providing an alternating weld current which produces an inductive reactance having an ohmic value greater than the ohmic value of the resistance between the cooperating electrodes.

It is a further object of this invention to provide a method of seam welding can bodies in accordance with the foregoing wherein the provision of a weld current includes the application of an alternating current through the overlapping blank edge portions via the cooperating electrodes and an inductive load.

The nature of the invetnion will be more clearly understood by reference to the following detailed description, the appended claims, and the several views illustrated in the accompanying drawings.

BRIEF DESCRIPTION OF THE DRAWING

FIG. 1 is a diagrammatic view of the invention indicating can body seam welding apparatus, and shows the disposition of can body forming blanks with respect to two electrodes for applying a welding current through overlapping portions of such blanks.

FIG. 2 is a diagrammatic view of the weld current path and shows the disposition of overlapping blank portions between the two electrodes.

FIGS. 3A and 3B are a graphical representation of the welding current obtained from a sinusoidal source.

FIGS. 4A and 4B are a graphical representation of the welding current obtained from a source of relatively square waves.

FIG. 5 is a graphical representation of impedances present in the welding current path, and shows the relationship of inductive reactance in such path to the resistance.

DESCRIPTION OF THE PREFERRED EMBODIMENT

Referring to the drawings, in FIGS. 1 and 2, the numeral 10 indicates generally an apparatus, according to the invention, for forming a number of metallic blanks 11 into tubular can bodies. The body forming apparatus 10 includes an elongated metallic horn 12 and motion imparting or advance means 13 which may include suitably selected apparatus for handling and conveying the blanks 11 along a path generally parallel to the extension of the horn 12 for formation into tubularly shaped can bodies. Generally indicated at 14 is apparatus for forming the blanks 11 into a tubular shape. The forming apparatus 14 may be suitably chosen to gradually bend or warp the blanks 11 from a flat rectangular shape into a closed cylindrical shape encircling the elongated metallic horn 12 as the blanks 11 are moved along the horn 12 by the advance means 13. Any one of a number of previously known advancing apparatus or means 13 and forming apparatus 14 may be employed in cooperation with the horn 12 to advance and form the blanks 11 such that the side edges 15 and 16 meet and overlap to provide an interface 17 of relatively small width.

A first electrode 18 is rotatably mounted adjacent the horn 12 as at point 20 in FIG. 2. The electrode 18 is positioned such that the peripheral surface 21 of the electrode 18 contacts the upper surface 22 (as oriented in FIGS. 1 and 2) of the blank edge portion 15 during passage of the formed blank 11 along the horn 12.

A second roller electrode 24 is provided in alignment with the first electrode 18 and has its peripheral surface 25 positioned for engagement with a lower surface 26 of the blank edge portion 16 during passage of blank 11 along the horn 12 and between the two electrodes 18 and 24.

It will be understood at the outset that while in the embodiment shown the electrodes disclosed are of the roller type, the invention is not limited thereto but is also applicable to apparatus in which other types of electrodes such as sliding or shoe electrodes are utilized.

The electrode 24 is rotatably mounted as at point 27 shown in FIG. 2 and is supported for upward movement by mounting device 28 (see also FIG. 1), which provides a force F to maintain a constant but adjustable force on the electrode 24 and the blanks passing between the electrodes. The mounting device 28 may be of the type including a stationarily mounted fluid actuated cylinder 30 having an upwardly extending piston rod 31 which rotatably mounts the second electrode 24. A suitably actuated fluid source (not shown) may be employed in cooperation with the fluid actuated cylinder 30 to supply fluid pressure to the cylinder 30 via a line 32 upon the entrance of the overlapping blank side edge portions 15 and 16 between the two electrodes 18 and 24. Actuation of the force exertive means 28 applies the force F to the lower electrode 24 to tightly sandwich the overlapping edge portions 15 and 16 between the two electrodes 18 and 24 during the passage of the blanks 11 past the electrodes.

A suitable generator of alternating current 35 which may include a step-down transformer 35a is electrically connected to the electrodes 18 and 24 by the conductors or leads 33 and 34 which contact the electrodes 18 and 24 in commutator fashion, or through suitable rotary mounting connections 20 and 27. The generator or current source 35 provides an alternating current which is utilized to weld the edge portions 15 and 16 at the interface 17 in a continuous line of weld.

In view of the relatively heavy current employed in the welding together of the overlapping blank edge portions 15 and 16, the conductors or leads 33 and 34 are of relatively heavy metallic construction dimensioned to handle the high currents. The metallic horn 12 may, in of itself, constitute one portion of the lead 33 such that conduction occurs within the horn itself. Similarly, it will, of course, be realized that suitable cooling provisions may be employed in cooperation with the leads 33 and 34 to maintain the heating of such paths within a practical range determined by the current requirements of the paths.

As is known in the prior art, an additional tack welding current source 36 (as seen in FIG. 1), and including tack welding electrodes 37 and 38 may be provided to tack weld the overlapping edge portions 15 and 16 of the blanks 11 in their tubular configuration prior to insertion of the edge portions 15 and 16 between the electrodes 18 and 24. Tack welding of the overlapped edge portions 15 and 16 at spaced points along the length thereof, of course, also alters the resistance across such overlapped edge portions at the area of the tack weld.

The electrical circuit, more specifically, the composite path of the welding current from the generator 35 to the electrodes 18 and 24 will first be traced, then various individual circuit parameters which are pertinent for present purposes will be explained.

The current path may be traced from generator 35 through lead 33; the resistance R4, which indicates the brush or mechanical resistance at the connection of roller 18 to lead 33; roller 18, with its inherent resistance R7; resistance R3, occurring at the surface of roller 18 abutting edge portion 15 of blank 11; edge portion 15; resistance R1, occurring at the interface 17; edge portion 16; resistance R3' occuring at the surface of roller 24 abutting on edge portion 16; roller 24, with its inherent resistance R7'; resistance R4', the brush or mechanical resistance at the connection of roller 24 to lead 34; and, an inductance L2 back to generator 35. Additionally, and as is well known, leads 33 and 34 include inherent resistances R5 and R6, respectively.

The above-noted resistances in the path of the welding current will now be discussed in more detail. Resistance R1 occurs at the interface 17 of the two overlapping edge portions 15 and 16 and the ohmic value of resistance R1 is dependent upon various factors including (a) the force F imparted to the edge portions 15 and 16 via the electrode 24, (b) the surface treatment of the surfaces meeting at the interface 17, (c) the width of the interface and hence the overlap of the edge portions 15 and 16, and (d) the metallic material of which blank 11 is formed.

A second pair of resistances R2 and R2' are provided by the edge portions 15 and 16 and the ohmic value of these resistances is dependent upon various factors including (a) the metallic material of which the blank 11 is formed, (b) the characteristics of such metallic materials, and (c) the thickness of the edge portions 15 and 16.

A pair of resistances R3 and R3' occur at the abutment or contact point of the electrodes 18 and 24 with the surfaces 22 and 26 of the edge portions 15 and 16, respectively. The ohmic value of the resistances R3 and R3' is dependent upon various factors including (a) the force F applied to the roller 24, (b) the surface treatment of the blank 11, (c) the material of which blank 11 is formed, and (d) the area of contact of the rollers 18 and 24 with the exterior surfaces 22 and 26.

Resistances R4 and R4' occur at the electrical connection of the conductive leads 33 and 34 with the electrodes 18 and 24, respectively, whether such electrical connection be via brush connection or the mechanical mounting of the roller electrodes. The conductive leads 33 and 34 each include respective inherent resistances R5 and R6.

Resistances R7 and R7' are the inherent resistances provided by the roller electrodes 18 and 24.

In addition to the resistances R1 through R7', the electrical circuit includes an inherent or self-inductance L1. The inductance L1 also depends upon various factors including (a) the quantities of metal in the conductive path, (b) the area or spacing between the conductor leads 33 and 34, (c) the apparatus or machinery in proximity to such conductors, and (d) the relative spacing of metallic parts in the overall apparatus 10. Thus, careful attention to the proportioning and spacing of the metallic portions of the apparatus 10 and to the relative disposition of the metallic elements thereof allows alteration of the inherent or self-inductance L1.

An additional reactive element, shown in FIG. 2 by the dotted lines as an inductor L2, may be employed to alter the reactance provided to the circuit by the inductance L1. While the aforementioned reactive element is shown in FIG. 2 as an inductor L2 in series with the several resistances in the conductive path and in series with the inductance L1, it is to be understood that one or more capacitive elements might be employed in the composite conductive path to provide a usable reactance.

A principal feature of the invention is the method and apparatus for providing a welding current which is not controlled or dependent upon the resistance in the composite conductive path.

In prior art circuits, various methods have been employed to maintain the welding current constant by minimizing the resistance and also the inductive resistance in the circuit. In contrast to the foregoing, the present invention discloses a new concept for maintaining a constant weld current and wherein the weld current is essentially independent of the resistance in the associated electrical circuit, and wherein the reactive impedance in said electrical circuit is directly utilized to maintain the current constant, as will now be explained.

As is known, it is desirable to provide a relatively constant current through the overlapping portions 15 and 16 so that the weld or heat energy employed in joining the portions 15 and 16 along the interface 17 is also substantially constant. The term "relatively constant current" should be understood to mean an alternating current which varies little from a predetermined amplitude level and not a direct current. The weld energy so employed is, of course, derived from the heat or power formula, $$P = EI$$

where

P is power in watts
E is voltage across the welding resistance
I is the current flowing in the circuit path since $$E = IR$$

R is the welding resistance including the portions 15 and 16 and in the interface $$P = I^2 R$$

As indicated hereinbefore, the several resistances R1 through R7′ in the electrical circuit or composite conductive path may vary. The total of the varying resistances will be designated as $Rv$ and will be considered hereinbelow.

In the present invention, the frequency of the alternating current from generator 35 is selected to be sufficiently high, and inductance L1 is selected and arranged to be relatively large, so that the ohmic value of inductive reactance XL is higher than the total ohmic value of the resistance $Rv$.

As is known, the formula for the inductive reactance is $XL = 2\pi f L$ wherein $\pi = 3.14$; $f$ is the frequency of the alternating current, and L is the inductance of the circuit. In accordance with the foregoing, the inductance XL increases directly with frequency. Note that the effective resistance of the circuit will also vary somewhat with the frequency due to skin effect, hysteresis losses, etc.; however, for present purposes, the resistance is considered not to vary with frequency.

Refer now to FIG. 5 which indicates the resulting impedance, $$Z = \sqrt{Rt^2 + XL^2}$$

in the electrical circuit or conductive current path and represents the vectorial addition of the inductive reactance and the total resistance of the circuit including the varying resistance $Rv$, and the inherent constant resistance R in the circuit, $Rt = Rv = R$.

As shown in FIG. 5, the impedance $$Z = \sqrt{Rt^2 + XL^2}$$

is largely of a reactive characteristic and the varying resistance $Rv$ constitutes only a small percentage of the total impedance Z in the current path.

It can be further appreciated that as the frequency increases and XL becomes larger (as at B in FIG. 5), the dimensions of the vectorial rectangle change with the varying resistance $Rv$ becoming less of a factor in the total impedance Z. Thus, in accordance with the invention, the output frequency of the generator 35 and inductive reactance in the electrical circuit are utilized and are arranged so that the impedance characteristics of the circuit are such that, in the path of the welding current, the ohmic value of the reactance XL substantially exceeds the varying ohmic value of the resistance $Rv$. Accordingly, the welding current through the composite conductive path is substantially independent of the resistance $Rv$ inasmuch as such variations result in only relatively slight variations in the overall impedance Z. Further, it has been found that any slight variations in the varying resistance $Rv$ contributes mainly to a variation in the power factor angle instead of directly effecting the absolute value of the overall impedance.

As discussed above, the inherent inductance L1 of the circuitry indicated in FIG. 2 is usually sufficient for purposes of working with the frequency output of generator 35. However, it will, of course, be realized that an additional inductance L2 may be connected in the current path, as indicated in FIG. 2, if required for providing a sufficient inductive reactance at the output frequency of generator 35.

Thus, the presence of an overall circuit impedance as shown in FIG. 5 results in little current variations in response to varying resistances and, accordingly, a relatively constant current is obtained. Consequently, the welding or $I^2R$ heat energy effective at the overlapping portions 15 and 16 provide a continuous welding seam along the length of the interface 17 without significant discontinuities or deterioration of the can body resulting from any undesired current changes.

In certain applications an A.C. welding current having a sinusodial characteristic (as shown in FIG. 3A) and providing an $I^2R$ waveform (as in FIG. 3B) may be employed to provide the welding energy. For other and generally higher speed operations, that is, in cases where the blanks 11 are moving past the electrodes 18 and 24 at relatively higher production speeds, it may be desirable to provide an alternating square wave current input as shown in FIG. 4A which provides an $I^2R$ waveform as in FIG. 4B. A square waveform having a relatively flat peak amplitude extending over a relatively long period will provide an even, more uniform heat energy than will a sinusodial wave of constant amplitude, since the effective $I^2R$ welding current will be applied to the workpieces for a maximum time during each cycle of the waveform.

It will, of course, be understood that the alternating square wave current provided to the circuit of FIGS. 1 and 2 will be less square or perfect than theoretically indicated in FIGS. 4A and 4B. As is known, a square wave is composed of the fundamental and harmonics of a sine wave and if an infinite number of the odd harmonics are added, a perfect square wave will result; however, in practice a perfect square wave is difficult to obtain and a "square" wave as shown in FIG. 4A is considered adequate.

It will be understood that the method and apparatus of the invention, and description recited hereinabove, are equally applicable for use in connection with other types of resistance welding including spot or butt welding. Thus, the invention may be used generally in the welding of metallic materials of any suitable thickness including the seam welding of sheet materials. For example, in FIGS. 1 and 2, the portions 15 and 16 could comprise separate sheets of material being welded along any desired line. Further, the two portions 15 and 16 instead of being overlapped could be butted against each other and welded.

While the invention has been particularly shown and described with reference to a preferred embodiment thereof, it will be understood by those skilled in the art that changes in form and details may be made therein without departing from the spirit and scope of the invention.

I claim:

1. The method of seam welding comprising providing first and second electrodes connected to and forming a part of an associated electrical circuit, supplying metallic blanks and forming the blanks to have overlapping edge portions, inserting the overlapping edge portions between and into contact with said electrodes, applying to said circuit as a welding current an alternating current having a frequency sufficient to make the inductive reactance of said electrical circuit relatively large in comparison with the resistance in said circuit.

2. The method of seaming can bodies comprising supplying a number of metallic blanks, shaping the blanks into a tubular configuration including placing two of the edges of said blanks in overlapping relation, providing a pair of electrodes, bringing the electrodes into contact with the overlapping edges of the blanks, supplying an alternating weld current having a reactance of higher ohmic value than the ohmic value of the resistance in the current path through the electrodes and overlapping blank edges maintaining the weld current through the edges relatively constant during alterations in the resistance through the current path including the electrodes and the overlapping blank edges.

3. The method according to claim 2 wherein said step of supplying a weld current comprises providing a current of sufficiently high frequency to provide an inductive reactance having an ohmic value in excess of the ohmic value of the resistance in the current path.

4. The method according to claim 3 wherein said step of supplying an alternating weld current comprises providing a weld current from a generator source of substantially square waves.

5. The method according to claim 4 further includes the step of tack welding the overlapping edges thereof at spaced points along the length thereof prior to the supplying of the alternating weld current therethrough.

6. The method according to claim 2 wherein said step of maintaining the weld current relatively constant comprises providing an inductive reactive load in series with the electrodes and the overlapping blank edges therebetween and supplying weld current through the inductive load, electrodes and blank edges.

7. The method according to claim 6 wherein the step of supplying weld current comprises providing in said electrical circuit a substantially square wave alternating current of sufficiently high frequency to provide in said electrical circuit an inductive reactance which is higher in ohmic value than the ohmic value of the resistance in the current path.

8. Apparatus for forming can bodies through the seam welding together of overlapping edge portions of metallic blanks comprising cooperating electrodes, means for inserting the overlapping edge portions of the blanks between and in contact with said electrodes to provide a resistance path through said electrodes and edge portions, electrical conduction means for supplying weld current to said electrodes and through said overlapping edge portions, an alternating current source electrically connected to said electrical conduction means for providing an alternating weld current in said conduction means, said alternating current source having an output frequency productive of an inductive reactance in the composite current path including the conduction means, electrodes and edge portions greater in ohmic value than the ohmic value of resistance through said conduction means and said electrodes.

9. Apparatus according to claim 8 wherein said alternating current source comprises a square wave current generator for providing a relatively square wave current through said edge portions of said blank.

10. Apparatus according to claim 8 wherein said conduction means comprises a relatively large inductive load in series connection with said electrodes.

11. Apparatus for forming can bodies through the seaming together of overlapping edge portions of tubularly configured metallic blanks comprising a pair of aligned electrodes, means for positioning the overlapping edge portions of the blanks between and in contact with said electrodes to provide a resistive current path through said electrodes and edge portions, means for maintaining a relatively constant alternating weld current through said overlapping edge portions during changes in resistance in said resistive current path, said means for maintaining a relatively constant current through said resistive path comprising current conduction means electrically connected to said electrodes and an alternating current source electrically connected to said current conduction means for providing an alternating weld current through said overlapping edge portions and for producing an inductive reactance of ohmic value in excess of the ohmic value of resistance in said resistive path.

12. Apparatus according to claim 11 wherein said alternating current source comprises a source of generally square wave alternating current.

13. Apparatus according to claim 11 further comprising an electrode mounting horn, means for advancing said tubularly configured blanks along said horn and in encircling relation thereto, said current conduction means extending through said horn in conductive relation to said horn mounted electrode.

14. Apparatus according to claim 13 wherein said electrodes are roller electrodes mounted for rotary movement in contact with said overlapping blank edge portions.

15. Apparatus for resistance welding of superposed portions of metallic sheet material comprising cooperating electrodes for respectively contacting the superposed portions of said sheet material to provide a resistive path from one of said electrodes to another electrode, conduction means electrically connected to said electrodes for providing a composite weld current path, and alternating current means having an output frequency matched to said composite weld current path for producing a reactance therein having an ohmic value in excess of the ohmic value of the resistance through said electrodes, whereby variations in the resistance through said electrodes produces minimum variation in weld current.

16. A method of electrical resistance welding consisting of the steps of providing cooperating welding electrodes connected to and forming a part of an associated electrical circuit having resistance and inductance, supplying metallic materials to be welded, placing the metallic material in electrical contact with said electrodes, and applying to said circuit as a welding current an alternating current having a frequency which causes the inductive reactance of said electrical circuit to be relatively large in comparison with the resistance in said circuit whereby variations in the resistance in said circuit and through said electrodes produce a minimum variation in welding current.

17. The method of claim 16 including the step of positioning the metallic materials to have overlapping portions in contact with said electrodes.

18. Apparatus for electrical resistance welding of metallic materials comprising cooperating welding electrodes, means for positioning the metallic materials to be welded in electrical contact with said electrodes, circuitry having resistance and inductance being electrically connected to said electrodes, means connected to said circuitry for providing as the welding current an alternating current having a frequency which causes the inductive reactance of said electrical circuit to be relatively large in comparison with the resistance in said circuit, whereby variations in the resistance through said circuit and said electrodes produces a minimum variation in welding current.

19. Apparatus as in claim 18 wherein said electrodes are positioned in spaced relation and the metallic material is passed therebetween.

20. Apparatus as in claim 18 wherein reactive elements are selectively added to said circuitry.

References Cited

UNITED STATES PATENTS

| | | | |
|---|---|---|---|
| 1,637,031 | 7/1927 | Tobey | 219—81 |
| 1,663,970 | 3/1928 | Brenzinger | 219—64 |
| 2,444,465 | 7/1948 | Peters | 219—64 X |
| 3,042,788 | 7/1962 | Foster | 219—67 |
| 3,263,053 | 7/1966 | Rudd | 219—67 X |

JOSEPH V. TRUHE, Primary Examiner

L. A. SCHUTZMAN, Assistant Examiner

U.S. Cl. X.R.

219—67, 81, 83, 108

UNITED STATES PATENT OFFICE
CERTIFICATE OF CORRECTION

Patent No. 3,542,992              Dated November 24, 1970

Inventor(s) Joseph J. Sennello

It is certified that error appears in the above-identified patent and that said Letters Patent are hereby corrected as shown below:

Column 1, line 48, "resisance" should read -- resistance --; line 54, "resitsance" should read -- resistance --. Column 2, line 4, "n" should read -- in --. Column 6, line 2, "Rv=R" should read -- Rv+R --. Column 8, line 68, after "circuit" insert a comma.

Signed and sealed this 17th day of August 1971.

(SEAL)
Attest:

EDWARD M. FLETCHER, JR.              WILLIAM E. SCHUYLER, JR
Attesting Officer                    Commissioner of Patents